May 8, 1928. 1,668,991
H. A. TUTTLE
REVERSING GEARING
Filed Aug. 2, 1927 3 Sheets-Sheet 2

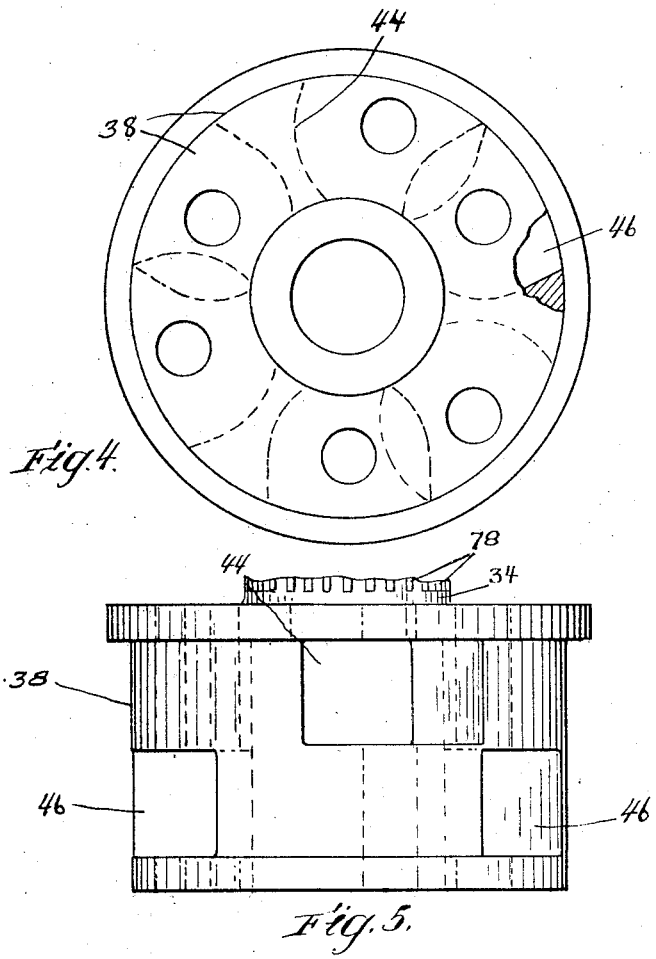

Patented May 8, 1928.

1,668,991

UNITED STATES PATENT OFFICE.

HENRY A. TUTTLE, OF UPTON, MASSACHUSETTS.

REVERSING GEARING.

Application filed August 2, 1927. Serial No. 210,122.

This invention relates to reversing gearing especially adapted for marine propulsion and of the type comprising aligned driving and driven shafts and means including planetary pinion gears to connect the shafts for the reverse drive of the driven shaft.

In a gearing of this type it is desirable to make the planetary pinion gears as large as is practicable whereby to keep down the speed of rotation thereof and thus insure longer life and freedom from wear of the gearing. Ordinarily, large pinion gears can be provided in the usual type of planetary gearing only by increasing the overall diameter of the gearing which is highly undesirable since space is limited.

It is an object of this invention to provide a planetary reversing gearing so arranged that large planetary pinion gears can be used without increasing the external diameter of the gearing.

A further object of this invention is the provision of a gearing having large planetary pinion gears and also a relatively high speed in reverse.

In accomplishing the above objects, I provide a reversing gearing having a plurality of sets of planetary pinion gears each set comprising two separate pinion gears of different diameters. One of the pinion gears is arranged to drive the other gear through an interposed idler gear.

It is a further object of this invention to have the idler gear common to all of the planetary pinion gears.

It is a yet further object of the invention to arrange the idler gear co-axially with the driving and driven shafts and within the sets of circumferentially-spaced planetary pinion gears so that a symmetrical arrangement of gearing is provided wherein the driving forces are balanced and wherein a gearing of small external diameter is obtained.

A further object is generally to improve the construction and operation of reversing gearings.

Fig. 4 is an end elevation of the planetary gear carrier.

Fig. 5 is a plan view of the gear carrier.

Figure 1:
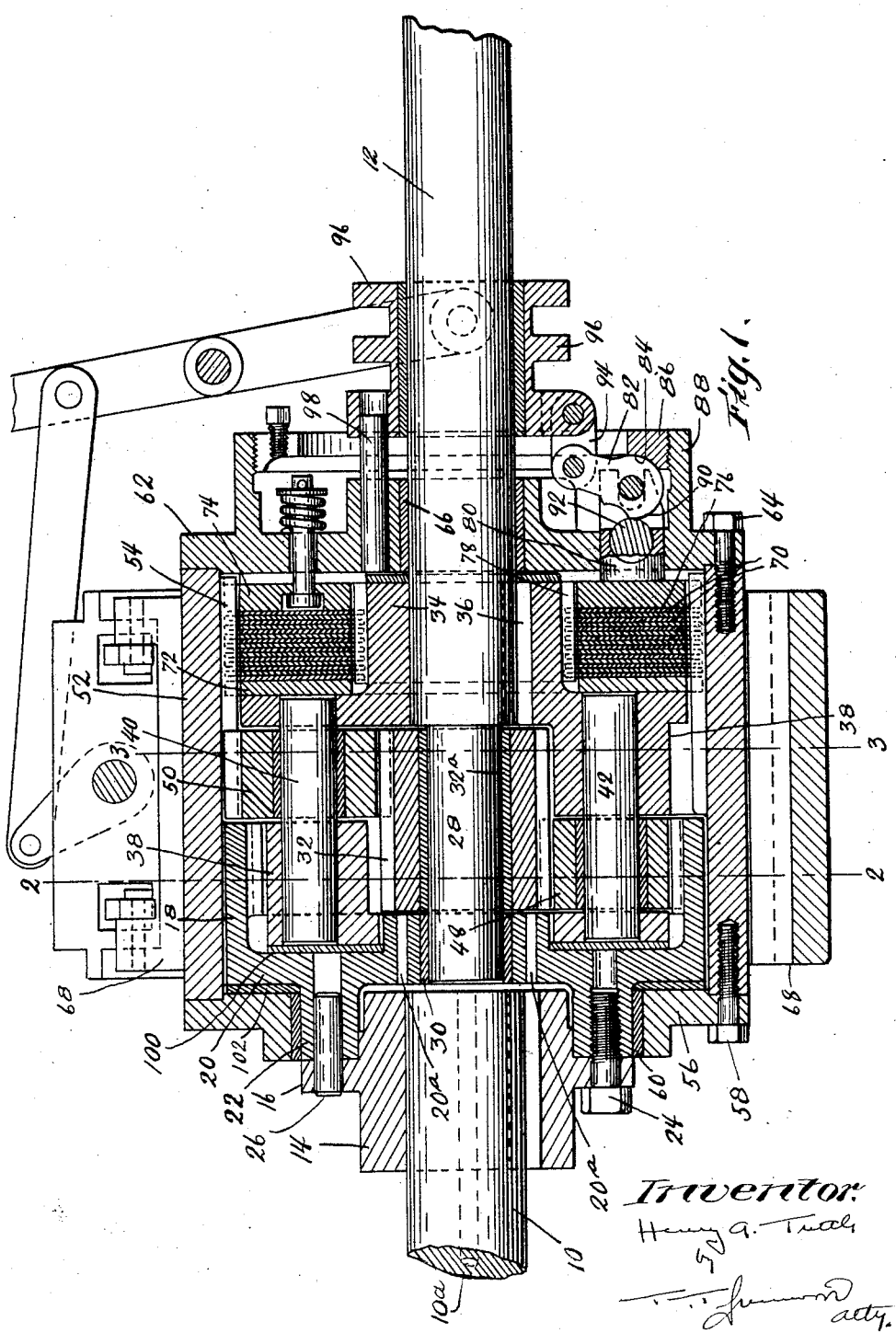
Fig. 1 is a longitudinal sectional elevation through a reversing gearing embodying this invention.
Figure 2:
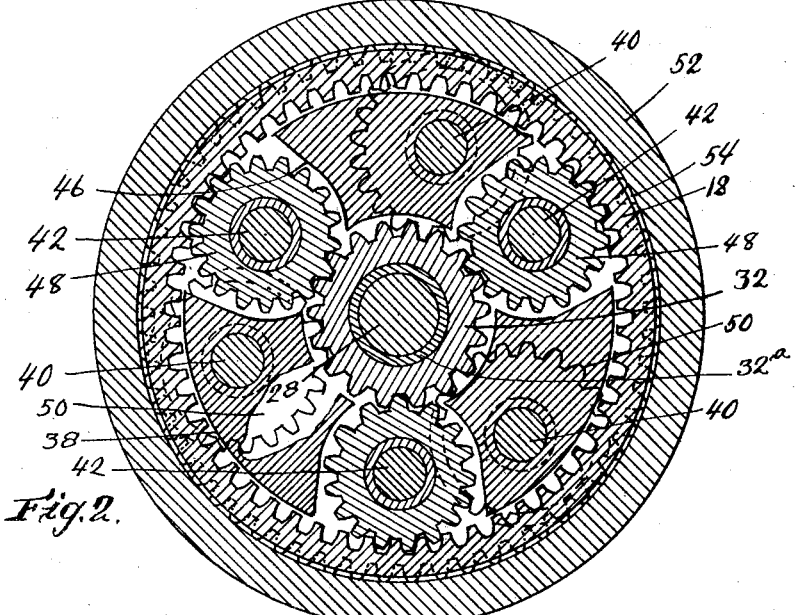
Fig. 2 is a section along line 2—2 of Fig. 1.
Figure 3:
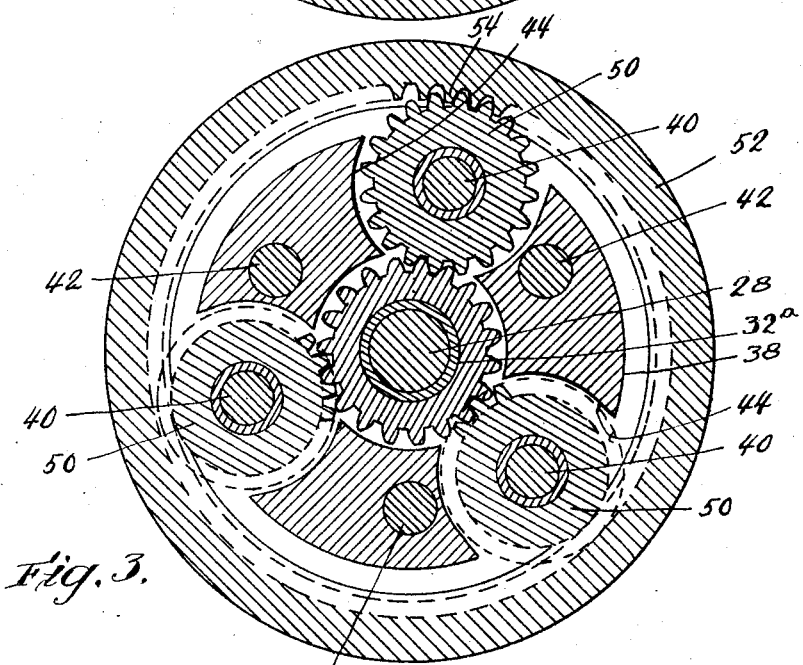
Fig. 3 is a section along line 3—3 of Fig. 1.

As here shown, the reversing gearing embodying this invention includes the driving shaft 10 which may be driven from an engine, and the driven shaft 12 which may be the propeller shaft and is axially aligned with the driving shaft. The driving shaft has a hub 14 fixed to the end thereof which hub has an annular outstanding flange 16. An internal gear 18 has an inwardly directed wall 20 provided with a forwardly extended annular hub 22 that is seated upon the hub 14 and against the flange 16 thereof. Bolts 24 and a dowel pin 26 serve to connect said hub 22 with the hub 14, whereby to secure the internal gear 18 in driving connection with the driving shaft 10. The driven shaft 12 has a reduced forward section 28 the end of which is rotatably received in a bearing 30 in the wall 20 of the internal gear. An idler pinion 32 constituting a part of this invention is rotatably supported on said reduced section 28 between the wall 20 of the internal gear and the full diameter of the driven shaft. A planetary pinion gear carrier has a hub 34 which is fixed to the driven shaft 12 by the key 36 in back of the reduced forward portion 28 thereof and is provided with an annular cylindrical section 38 which overlies the idler gear 32. Sets of pinion-carrying pins 40 and 42 respectively are fixed in said cylindrical section parallel with the axis of the driving and driven shafts and are extended through pinion-receiving apertures 44 and 46 in the gear carrier. A small planetary pinion gear 48 is received in each of said apertures 46 and is journalled on each of the pins 42. Said pinion gears are arranged in mesh with the internal driving gear 18 and also in mesh with the idler gear 32. Large planetary pinion gears 50 are received in the apertures 44 of the gear carrier and are journalled on the pins 40 of said carrier and are arranged in mesh with the idler gear 32. A casing or drum 52 encloses the gearing elements and has internal gear teeth 54, constituting a brake gear, which are in mesh with the large pinion gears 50. Said casing is provided with a forward end plate or wall 56 which is secured to the casing by bolts 58 and is rotatably supported through a bushing 60 on the hub 22 of the driving internal gear 18. Said casing is also provided with a rear cover plate or wall 62 which is detachably secured to a casing by bolts 64 and is rotatably supported through a bushing 66 on the driven shaft 12. A brake band 68 which may be of more or less usual construction is arranged to encircle and engage said casing and hold it stationary to set the gearing for reverse drive.

Clutch mechanism is provided to clutch the casing to the driven shaft 12 whereby to lock the planetary gearing elements and thus set the gearing for direct drive, the line of drive being through the gears. The clutch mechanism includes a set of clutch plates 70 which are provided with external gear teeth in their peripheries which mesh with extensions of the internal gear teeth 54 of the casing 52. End plates 72 and 74 are similarly arranged and constitute backing and pressure members for the clutch plates. A second set of clutch plates 76 is interspaced with the clutch plate 70 and is provided with internal gear teeth in their inner peripheries which are in mesh with external gear teeth 78 formed on the hub 34 of the gear carrier. Pressure is adapted to be applied to the clutch by thrust pins 80 slidable in the rear end plate 62 in the casing and adapted to bear against the pressure plate 74. Said pins are moved axially to set the clutch by links 82 which have rocking seats in the groove 84 of an annular ring 86 which is internally screw threaded in an annular projection 88 of the plate 62. Said links are provided with cam faces 90 which are adapted to bear upon cam pins 92 of the thrust pins 80 to set the clutch. Said links 82 are connected through links 94 with a clutch-operating sleeve 96 which is slidable axially on the driven shaft 12 and also on a pin 98 carried by the casing, for conjoint rotation with the casing.

The construction of the clutch operating mechanism and of the ring 86 are described and claimed in my co-pending application Serial No. 180,705, filed April 4, 1927 and need not be further described herewith since they do not form an important feature of this invention.

When the clutch is operated there is an axial thrust on the enclosing casing 52 tending to move it axially and loose wear plates 100 and 102 are interposed respectively between the gear carrier and the wall 20 of the internal gear and between said wall and the forward end plate 56 of the enclosing casing to receive the clutch thrust and provide undue wear thereat.

With the arrangement of the gearing as herein described, it will be apparent that, when the casing 52 is held against rotation to set the gearing for reverse drive, the internal gear 38 rotates the small pinions 38 to drive the idler gear 32 and that the idler gear rotates the large pinion 58 upon the internal gear teeth of the stationary casing, thus to rotate the gear carrier and the driven shaft reversely. With the arrangement shown, it will be seen that the planetary pinion gears 48 and 50 can be much larger than usual without an increase in the external diameter of the casing 52 and while maintaining a relatively high speed in reverse. The idler gear 32 can also be relatively large in diameter. With this arrangement, the speed of rotation of the pinion gears is relatively slow compared with what has been the case heretofore so that the wear on the bearings of the pinion gears is materially reduced. Since the pinion gears are large, the number of teeth in engagement between the pinion gears and the cooperating gears is increased thus to reduce the stresses on the gear teeth and decrease the wear thereof.

Since the idler gear 32 is common to all of the sets of pinion gears, a substantial reduction in the number of gearing elements is obtained and, with the axial disposition of the idler gear, the pressure on the gear around its circumference is practically balanced and there is little tendency for the bushing 32ᵃ thereof to wear.

The gearing is lubricated by oil flowing through the passage 10ᵃ in the driving shaft 10 and through passages 20ᵃ in the hub of the internal gear 20.

I claim:

1. Gearing mechanism comprising the combination of a driving element, a driven element, a pair of separate planetary pinion gears adapted to connect said elements, for the driving of said driven element, an idler gear meshing with both of said pinion gears, a brake gear meshing with one of said pinion gears and adapted to be held stationary for reverse drive, and a driving gear driven by said driving element meshing with said other pinion gear.

2. In a gearing mechanism, the combination of a driving gear, a driven planetary gear carrier, a pair of separate pinion gears rotatably carried by said carrier, one of said gears being in mesh with said driving gear, an idler gear in mesh with both of said pinion gears, and a brake gear in mesh with said other pinion gear and adapted to be held stationary to set the gearing for reverse drive.

3. In a reverse gearing, the combination of a driving internal gear, a driven pinion gear carrier, a pair of separate pinion gears rotatably mounted on said gear carrier, one of said pinion gears arranged in mesh with said driving internal gear, an idler pinion gear in mesh with both of said planetary pinion gears, and an internal brake gear in mesh with said other planetary pinion gear and adapted to be held stationary to set the gearing for reverse drive.

4. In a gearing mechanism, the combination of aligned driving and driven shafts, a driving gear fixed to the driving shaft, a planetary gear carrier fixed to the driven shaft, a pair of planetary pinion gears rotatably mounted on said gear carrier, one of which planetary pinion gears is arranged in mesh with said driving gear, an idler gear in mesh with both of said planetary pinion gears and disposed co-axially with said driving and driven shafts, and a brake gear in mesh with said other planetary pinion gear to set the gearing for reverse drive.

5. In a gearing mechanism, the combination of aligned driving and driven shafts, a driving internal gear fixed to said driving shaft, a planetary gear carrier fixed to said driven shaft, a pair of separate planetary pinion gears journalled on said gear carrier, an idler gear in mesh with both of said planetary pinion gears and co-axially disposed with said driving and driven shafts, and an internal gear in mesh with said other planetary pinion gear and adapted to be held stationary to set the gearing for reverse drive.

6. In a gearing mechanism, the combination of a driving element, a driven element, gearing connecting said elements including sets of planetary pinion gears, each set comprising two independent pinion gears, an idler gear which is common to all the sets of planetary pinion gears and which is in mesh with the two pinion gears of each set, a gear driven by said driving element in mesh with one of said pinion gears, and a brake gear in mesh with said other pinion gear.

7. In a gearing mechanism, the combination of a driving element, a driven element, gearing connecting said elements including sets of planetary pinion gears, each set comprising two independent pinion gears, an idler gear which is common to all the sets of planetary pinion gears and which is in mesh with the two pinion gears of each set and which is disposed concentrically with the common axis of revolution of said sets of planetary pinion gears, a gear driven by said driving element in mesh with one of said pinion gears, and a brake gear in mesh with said other pinion gear.

8. In a reversing gearing, the combination of a driving gear, a driven planetary gear carrier, sets of planetary pinion gears carried by said carrier, each set comprising two independent pinion gears one of which is in mesh with said driving gear, a brake gear meshing with the other pinion gear of each set, and an idler gear disposed within said sets of pinion gears and in mesh with both pinion gears of each set.

9. In a reverse gearing, the combination of aligned driving and driven shafts, a driving internal gear fixed to said driving shaft, a planetary gear carrier fixed to said driven shaft, sets of planetary pinion gears journalled on said carrier, each set comprising two independent pinion gears, one of which is in mesh with said driving internal gear, an internal brake gear in mesh with the other pinion gear of each set, and an idler gear co-axially disposed with said driving and driven shafts and disposed within said sets of planetary pinion gears and in mesh with the pinion gears of each set.

10. In a gearing mechanism, the combination of aligned driving and driven shafts, a driving internal gear fixed to said driving shaft, a planetary gear carrier fixed to said driven shaft, sets of planetary pinion gears journalled on said gear carrier, each set comprising two independent pinion gears, one of which is in mesh with said driving internal gear, a brake gear in mesh with the other pinion gear of each set and adapted to be held stationary to condition the gearing for reverse drive and an idler pinion gear journalled on said driven shaft concentrically therewith and disposed within said sets of planetary pinion gears and common to all of said sets and arranged in mesh with both of the pinion gears of each set.

In testimony whereof, I have signed my name to this specification.

HENRY A. TUTTLE.